Figure 1:
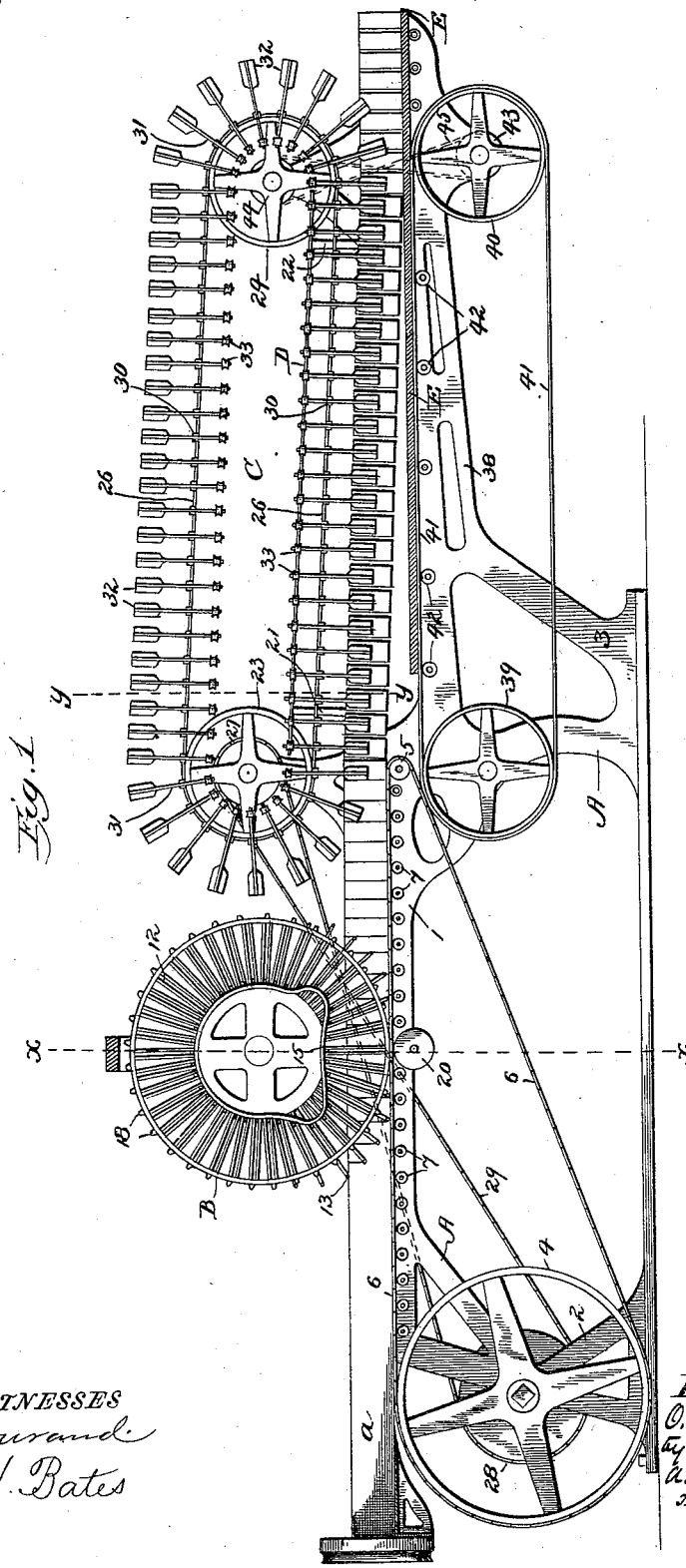

(No Model.) 3 Sheets—Sheet 1.

O. W. JOHNSON.
CUTTER FOR BRICK AND TILE MACHINES.

No. 478,436. Patented July 5, 1892.

WITNESSES
F. L. Ourand
Wm. H. Bates

Inventor
O. W. Johnson
by A. G. Kuylman
Attorney (No Model.) 3 Sheets—Sheet 2.
O. W. JOHNSON.
CUTTER FOR BRICK AND TILE MACHINES.
No. 478,436. Patented July 5, 1892.
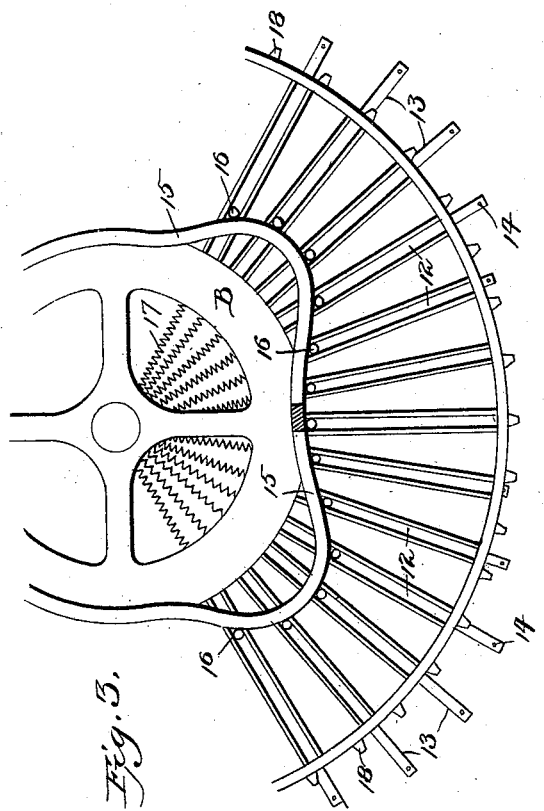
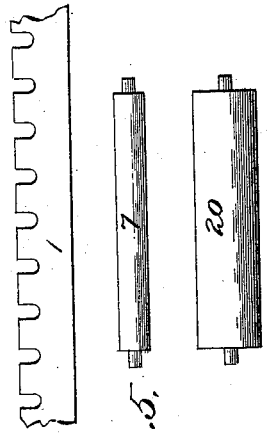
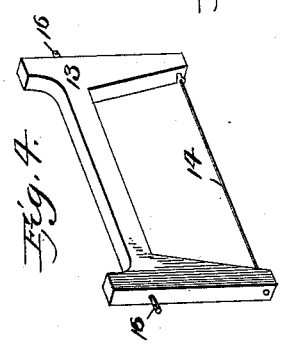
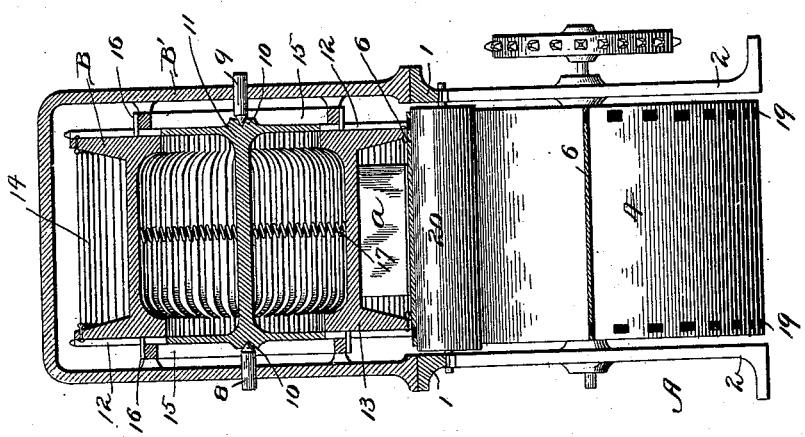
WITNESSES
F. L. Ourand
Wm H. Bates
INVENTOR
O. W. Johnson
by A. G. Huysman,
Attorney (No Model.) 3 Sheets—Sheet 3.
O. W. JOHNSON.
CUTTER FOR BRICK AND TILE MACHINES.
No. 478,436. Patented July 5, 1892.
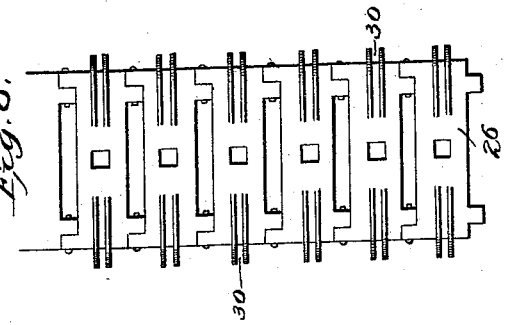
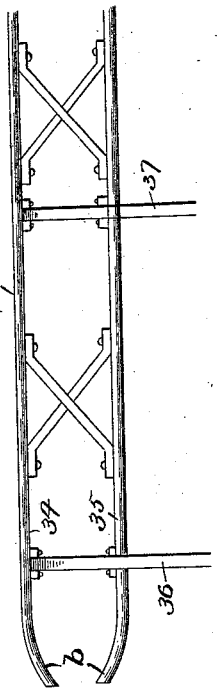
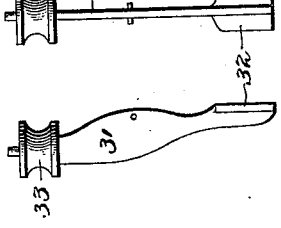
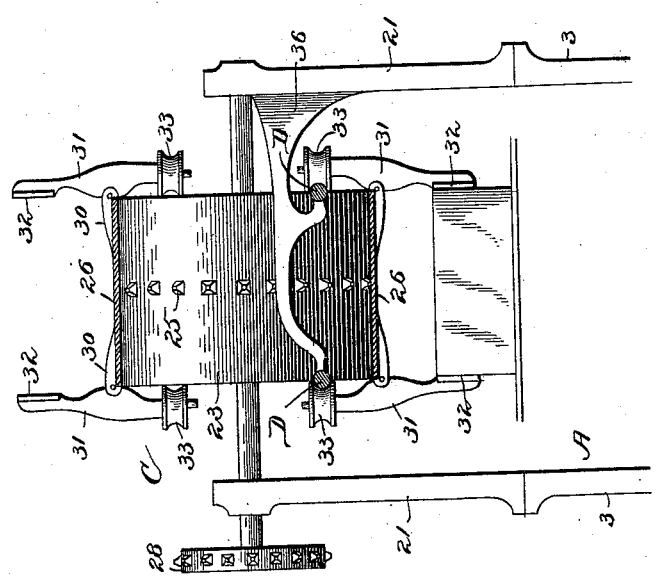
WITNESSES
F. L. Ourand
Wm H Bates
INVENTOR
O. W. Johnson
by A. G. Hufman
Attorney

UNITED STATES PATENT OFFICE.

OLIVER WARREN JOHNSON, OF BUCYRUS, OHIO, ASSIGNOR TO THE FREY-SHECKLER COMPANY, OF SAME PLACE.

CUTTER FOR BRICK AND TILE MACHINES.

SPECIFICATION forming part of Letters Patent No. 478,436, dated July 5, 1892.

Application filed April 7, 1890. Serial No. 347,003. (No model.)

*To all whom it may concern:*

Be it known that I, OLIVER WARREN JOHNSON, a citizen of the United States of America, residing at Bucyrus, in the county of Crawford and State of Ohio, have invented a new and useful Cut-Off and Delivery Table for Brick and Tile Machines, of which the following is a specification.

My invention has relation to improvements in cut-off and delivery tables for brick and tile machines; and the object is to provide an improved automatically-operating cut-off mechanism whereby the column of clay as it is moved from the clay-machine is cut into determined forms and delivered in sequence to a delivery-table, as will be hereinafter fully specified.

My invention consists in the novel construction of parts and their combination, as hereinafter described, and particularly pointed out in the claims.

In the accompanying drawings, illustrating my invention, Figure 1 is a side view of the complete machine, the mouthpiece of the clay-machine being shown as delivering the column to the table, the supports for the cutting-wheel and brick-carrier being removed to show the parts better. Fig. 2 is a transverse vertical section through the cut-off wheel on a line $x\ x$ of Fig. 1. Fig. 3 is a detail view of a portion of the cut-off wheel, illustrated on a larger scale than in Fig. 1. Fig. 4 is a detail of one of the frames for cut-off wire. Fig. 5 shows details of one of the side rails of the frame, the supporting small rollers to hold up the belt or apron, and the roller located under the cut-off wheel. Fig. 6 is a vertical view, partly in section, taken on the line $y\ y$ of Fig. 1, looking toward the belt-drum from the delivery end of the table. Fig. 7 is a detail of the arms or clamps for holding the forms after being cut and carried onto the board-delivery portion of the table. Fig. 8 is a plan view of a portion of the belt to which the clamps shown in Fig. 7 are attached, and Fig. 9 is a detail of the track-frame for operating the clamps.

A designates the frame on which the mechanism of the cut-off and delivering table is mounted and supported. This consists of duplicate side rails 1, supported on legs or standards 2 3, provided with the proper bearings for the journals of the respective drums and pulleys essential to operating the machine.

In the portion of the frame A constituting the cutting-table is a drum 4 adjacent to the clay-machine, and at the forward end of the cutting-table is journaled a small roller 5, and about these rollers is arranged a carrying belt or apron 6, the upper line or strand of which is supported on a series of small rollers 7, journaled in the side rails of the frame, as seen in Fig. 1 of the drawings. These small rollers are arranged to support the belt and keep it from sagging with the weight of the column of clay as it progresses from the machine and moves the belt 6 with it.

The column of clay is designated by $a$.

B designates the cut-off wheel, which is of novel and particular construction, which I will now proceed to describe. On the side rails of the supporting-frame is secured a frame B', in which bearings 8 9 are oppositely formed. These are preferably conical bearings to take in sockets 10 in the shaft 11 of the wheel B. This wheel consists of two disks fixed on or extended from the shaft 11 and formed with radial slots 12 in the disks or arms, as illustrated in Figs. 1 and 3 of the drawings. In these slots are arranged the ends of the cutting-wire frames 13, disposed therein so as to readily and easily slide to and from the axis of the cutting-wheel. These cutting-wire frames are made of a cross-piece having extended therefrom side pieces, as seen in Fig. 4 of the drawings, between the ends of which the cutting-wire 14 is secured and stretched.

To operate the cutting-wire frames so as to cut off the forms from the column of clay, I fix cams 15 to the frame B', which cams are of the tread or form seen in the drawings, Figs. 1 and 3, which cams as the cutting-wheel revolves are engaged by studs 16 on the ends of the cutting-wire frames, and the frames thus forced downward as the clay moves outward and cuts the column into determined shapes or bricks.

To prevent the wire-cutting frames from falling from the slots and to hold the lugs or studs 16 in contact with the tread of the cams, I attach retracting-springs 17 to the cross-bar of the wire-cutting frames and fasten the other end to the shaft of the cutting-wheel, as shown in the drawings. The cutting-wheel on its side rims has formed sprockets 18, which engage in sprocket-holes 19 on the edges of the belt 6, as indicated in Fig. 1 and shown in Fig. 2 of the drawings, and the cutting-wheel thus synchronously moved with the column of clay and belt. Directly under the cutting-wheel is journaled a roller 20, arranged with the upper radial point on a line with the vertical cut of the wires, so that at this point the brick or form is entirely severed from the column.

It will be observed from the foregoing description, in association with the drawings, that the cut of the wires is vertical or in a straight line across the form or column of clay, because the wire moves with the same movement forward in relation that the column moves in progression, and that the wires are lifted from the column after severence, with the same result.

C designates my improved carrying and delivery portion of the mechanism, which I will now proceed to describe. On the side rails of the frame are mounted standards 21 22, (see Fig. 6,) which are arranged at each end of the outer portion of the supporting-frame, in which are journaled drums 23 24, having sprockets 25 in their middle, which engage in openings in a belt 26. This belt 26 and drums 23 24 are moved by means of sprocket-wheels 27 28 on the shafts of the drums 4 and 23 and a chain 29, arranged on the wheels, as shown in Fig. 1 of the drawings. On the belt 26 are secured bearing-pieces 30, in which are fulcrumed arms 31, having their ends projecting out from the belt, flattened, as seen at 32, Figs. 1, 6, and 7, to engage the end surfaces of the forms, and having on their other or inner ends grooved rollers 33, which engage the guide-rails of the frame D. (See Figs. 1, 6, and 7.) This frame D consists of two guide-rails 34 35, held on the supports 36 37, projected from the standards 21 22. These guide-rails 34 35 have their inner ends curved inward, as seen in Fig. 9 of the drawings, at b, in order that as the arms are carried around by the belt the rollers engage and clamp the ends of the forms, as seen in Fig. 1 of the drawings, and hold them suspended, as shown, above and free from the board delivery until they are carried to the end of the guide-rails, when the pressure or hold of the arms is released and the forms are deposited on the delivery-board beneath them. The drums 23 24 are connected to the moving power to move slightly faster than the column of clay, in order that the forms may be separated from each other, as indicated, and deposited on the delivery-boards with spaces between them, as shown in Fig. 1. In the portion of the supporting-frame designated by 38 are mounted two drums 39 and 40, on which is a carrying-belt 41, the upper line of which is kept from sagging by being supported on rollers 42, journaled in the frame. The upper line of the belt inclines from the front or delivery end to the rear, as shown, so that the forms may be carried free from contact with the delivery-boards until the forms are released from the clamps or arms above and deposited thereon. To move the belt 41, a belt or sprocket connection is made between the drum 40 and the drum 24 by pulleys or sprockets 43 44 and belt 45.

E designates the delivery-boards, arranged on the belt 41, being placed thereon from the side of the table and carried forward by the movement of the belt to receive the bricks or forms and after being filled carried to any desired place.

The operation has been generally stated in specifying the functions of the respective parts of the mechanism; but the same is here more connectedly described as follows: As the column of clay moves from the machine it is received on the carrying-belt 6 and motion communicated to the belt by the frictional contact of the clay. As the clay column progresses it is moved under the cut-off wheel B and cut into determined forms by the cutting-wires, the frames of which are moved down, carrying the wires straight through the column. The forms are pushed forward after being cut and severed from the column until they reach the point where they are engaged and clamped by the arms on the carrying mechanism C, which, being geared to move faster than the column and the forms moved by it, takes the end form a distance from the rest and carries it along, held by the clamping-arms, and this operation is continued in succession as the arms come around. The forms are carried by the arms until they are released, when the forms are dropped at the delivery end of the table, from whence they are carried to any place desired.

Having thus described my invention, what I claim, and desire to secure by Letters Patent, is—

1. In a cut-off for brick and tile machines, the combination, with the carrying-belt for the clay and the column of clay, of a cut-off wheel formed with radially-arranged slots, cutting-wire frames arranged in the slots of the wheel, and cams to engage the cutting-wire frames and push them through the column of clay, substantially as described.

2. In a cut-off table for brick and tile machines, the combination, with the carrying-belt having sprocket-holes in its edges and the column of clay, of a cutting-wheel journaled over the table and formed with radial slots and provided with sprockets on its rim edges, wire frames arranged to slide in the radial slots of the wheel, having lugs on the ends, and cam-frames fixed at the sides of the wheels, whereby the cutting-wire frames are pushed outward and through the clay, substantially as described.

3. In a cut-off table for brick and tile machines, the combination, with a carrying-belt adapted to be moved by the advancing body of clay, of a cut-off wheel formed with radial slots, cutting-wire frames in the slots to slide therein, and springs connecting said frames to the shaft of the wheel to hold the cutting-wire frames from sliding free from the slots and to return them to normal position when moved from the center of the wheel, substantially as described.

4. In a cut-off table for brick and tile machines, the combination, with a carrying-belt adapted to be moved by the advancing body of clay, of a cut-off wheel moved by the carrying-belt and formed with radial slots, cams fixed at the sides of the cut-off wheel, cutting-wire frames arranged to slide in the radial slots and be engaged and moved outward by the cams, and springs to hold the cutting-wire frames inward and in engagement with the cams, substantially as described.

5. In a brick and tile cut-off machine, a rotative cut-off wheel formed with radial slots, cutting-wire frames in the slots, cams to engage and push the cutting-wire frames outward, and means to rotate the wheel synchronously with the moving body of clay, substantially as described.

6. In a brick and tile cut-off and delivery table, a rotative traveling belt adjacent to the severed forms of clay, oppositely-fulcrumed arms on the belt provided with rollers on their inner ends, and a track-frame arranged in the path of the rollers to spread the arms and cause the opposite ends of the arms to grasp and hold a severed portion of the clay, substantially as described.

7. In a brick and tile cut-off and delivery table, a board-delivery carrying-belt, a delivery-board on the belt, a traveling belt mounted above the board-delivering belt, clamping-arms on the upper traveling belt, and a frame to engage and spread the upper portions of the clamping-arms, substantially as and for the purpose specified.

8. The carrier for carrying the severed bricks from the cut-off table, consisting of drums, a belt arranged on the drums, clamping-arms fulcrumed to the edges of the belt, rollers on the inner ends of the arms, and a stationary frame in the path of the rollers to move the arms to grasp a brick with their opposite ends, whereby the brick may be carried along by the belt, and mechanism to rotate the drums, as specified.

9. The combination, with a cut-off wheel and a moving column of clay cut into forms thereby, of a carrier consisting of a traveling belt having clamping-arms to grasp the forms, means to operate the arms, and delivery-boards to receive the forms, substantially as described.

10. The carrying and delivering mechanism herein described, consisting of drums journaled on the table, a belt on the drums, arms fulcrumed to the belt, a frame D to spread the arms, and means to rotate the drums, substantially as described.

11. The combination, with the cut-off wheel and the moving column of clay, of the carrying mechanism C, consisting of a belt traveling faster than the column of clay and provided with clamps hinged thereto arranged to hold a form above the table at one end and deliver it at the other end, substantially as described.

12. The combination of the board-delivery table, composed of the frame 38, drums 39 40, and belt 41, arranged with its upper strand at an incline, and the carrying mechanism C, composed of a belt, arms fulcrumed to the belt, and a frame to spread the arms, substantially as set forth.

OLIVER WARREN JOHNSON.

Witnesses:
L. E. JONES,
A. H. WIDNEY.